United States Patent [19]

Mori et al.

[11] Patent Number: 5,041,339
[45] Date of Patent: Aug. 20, 1991

[54] MULTILAYERED SLIDING MATERIAL OF LEAD BRONZE CONTAINING GRAPHITE AND METHOD OF MANUFACTURING THE SAME

[75] Inventors: Sanae Mori; Masaaki Sakamoto, both of Nagoya; Koichi Yamamoto, Komaki; Kenji Sakai, Ichinomiya, all of Japan

[73] Assignee: Daido Metal Company, Nagoya, Japan

[21] Appl. No.: 396,403

[22] Filed: Aug. 21, 1989

[30] Foreign Application Priority Data

Sep. 6, 1988 [JP] Japan .................................. 63-221404

[51] Int. Cl.⁵ ................................................ B22F 3/00
[52] U.S. Cl. ..................................... 428/552; 428/553; 419/8; 419/11; 419/50; 75/243
[58] Field of Search ......................... 75/230, 247, 243; 428/553, 552; 419/9, 10, 7, 11, 8, 50; 420/472, 473, 474

[56] References Cited

U.S. PATENT DOCUMENTS

| | | | |
|---|---|---|---|
| 125,549 | 4/1872 | Dick | 420/474 |
| 2,072,070 | 2/1937 | Fisher | 75/231 |
| 3,375,107 | 3/1968 | Kranz | 420/472 |
| 3,461,069 | 8/1969 | Waldhutter et al. | 252/12 |
| 4,002,472 | 1/1977 | LeBrasse et al. | 75/208 R |
| 4,406,857 | 9/1983 | Mahrus et al. | 420/474 |
| 4,505,987 | 3/1985 | Yamada et al. | 428/553 |
| 4,732,818 | 3/1988 | Pratt et al. | 428/547 |
| 4,818,628 | 4/1989 | Alexander et al. | 428/561 |

FOREIGN PATENT DOCUMENTS

| | | |
|---|---|---|
| 624978 | 2/1936 | Fed. Rep. of Germany . |
| 3346553 | 10/1984 | Fed. Rep. of Germany . |
| 119144 | 9/1980 | Japan . |
| 57-70246 | 4/1982 | Japan . |
| 113335 | 7/1983 | Japan . |
| 131528 | 7/1983 | Japan . |
| 177341 | 10/1984 | Japan . |

Primary Examiner—Brooks H. Hunt
Assistant Examiner—Ngoclan Mai
Attorney, Agent, or Firm—Browdy and Neimark

[57] ABSTRACT

A multilayered sliding material of lead bronze containing graphite in the form of a bimetal, comprising a steel plate or a steel plate having a copper plating coating and a sintered copper alloy bonded to the steel plate, the sintered copper alloy having a composition consisting of 5 to 16 wt % Sn, 2 to 20 wt % Pb, 0.03 to 1 wt % P, 0.5 to 3.9 wt % graphite, and the balance Cu, wherein hardness of the alloy exceeds Hv 100.

3 Claims, 1 Drawing Sheet

MULTILAYERED SLIDING MATERIAL OF LEAD BRONZE CONTAINING GRAPHITE AND METHOD OF MANUFACTURING THE SAME

BACKGROUND OF THE INVENTION

1. Field of the Invention

The present invention relates to a multilayered sliding material of lead bronze containing graphite and to a method of manufacturing the same, this material being suitably used for bearings, bushes, and washers employed in automobiles, industrial machines, agricultural machines and so on.

2. Description of the Related Art

In the above-described fields, the main portion of the multilayered sliding material used for bushes and washers comprises bimetal type sliding materials comprising a steel back plate and a sintered alloy such as Cu-Sn-Pb type or Cu-Sn-graphite type, these materials having hardness of Hv 60 to 100. A sintered alloy having a hardness exceeding Hv 100 is used in a bimetal type sliding material comprising phosphor bronze and a steel back plate, this phosphor bronze containing neither lead nor lubricant. In the conventional bimetal type sliding material comprising a steel back plate and a sintered alloy there is used Cu-Sn-Pb or Cu-Sn-graphite sintered alloy which contains 10 to 30 wt% Pb and 2 to 8 wt% graphite. However, the recent advancement of the internal combustion engines requires a bearing material of the type capable of bearing higher pressures in comparison with the conventional bearing materials which is poor in load durability when bearing a higher pressure. On the other hand, the bimetal of the sintered alloy of phosphor bronze encounters a problem of poor seizuring resistance although the same has an excellent durability against load.

SUMMARY OF THE INVENTION

An object of the present invention is to provide a multilayered sliding material of lead bronze containing graphite for use in sliding bearings, this multilayered sliding material of lead bronze containing graphite exhibiting an excellent load durability which is obtained by reducing the contents of Pb and graphite in the conventional alloy, an improved mechanical properties such as the hardness of the alloy, the tensile strength, and creep resistance and so on all of which are obtained by performing rolling of a high reduction and an sufficient seizuring resistance which is obtained by containing both Pb and graphite.

In order to achieve the above-described object, a multilayered sliding material of lead bronze containing graphite of the invention is a material in the form of a bimetal comprising a steel plate or a steel plate having a copper plating coating and a sintered copper alloy bonded to the steel plate, the sintered copper alloy having a composition consisting of 5 to 16 wt% Sn, 2 to 20 wt% Pb, 0.03 to 1 wt% P, 0.5 to 4 wt% graphite, and the balance Cu and incidental impurities, wherein hardness of the alloy is not less than Hv 100, and whereby an excellent seizuring resistance and load durability can be obtained.

It is necessary for both Pb and graphite serving as lubricant to be included in the multilayered sliding material of lead bronze containing graphite according to the present invention. The reason for this lies in that Pb having excellent lipophilic property is effective during the presence of the lubricating oil, while graphite is effective when there exists no oil film so that a metal contact occurs, because the graphite itself is a solid lubricant. Furthermore, since Pb can melt and can permeate into the graphite during the sintering process and since the graphite is a porous substance, the embrittlement of the material due to the addition of the graphite can be relaxed. As a result, it has been found that the simultaneous addition of Pb and graphite is effective in a great degree.

A method of manufacturing the material shown above is characterized in that: mixed powder consisting of lead bronze alloy powder capable of passing through 200 mesh apertures (to be abbreviated to "−200 mesh" hereinafter) and graphite powder capable of passing through 350 mesh apertures (to be abbreviated to "−350 mesh" hereinafter) is distributed on the surface of a steel plate or a steel plate having a copper plating coating; the sintering and rolling thereof are effected and may have to be repeated more than once depending on the characteristics of the equipment used in order to reach the desired hardness and the final rolling is effected at a high reduction rate, whereby the hardness of the thus-prepared alloy is made to exceed Hv 100.

Next, the reasons for limiting the constituent and contents of the copper alloy of the sliding material according to the present invention and the reason for restricting the particle size of the lead bronze powder and the same of the graphite powder to be used for preparing the copper alloy will be described.

(a) Sn: 5 to 16 wt%

If it is less than 5 wt%, the strength and the wear resistance are insufficient. If it exceeded 16 wt%, the material suffers from embrittlement.

(b) Pb: 2 to 20 wt%

If it is less than 2 wt%, the lubricating performance is insufficient. If it exceeded 20 wt%, the strength of the alloy deteriorates excessively.

(c) P: 0.03 to 1 wt%

If it is less than 0.03 wt%, the strength is insufficient. If it exceeded 1 wt%, segregation of Pb is apt to be caused when the powder is prepared, and the toughness of the mechanical properties deteriorate.

(d) Graphite: 0.5 to 4 wt%

If it is less than 0.5 wt%, the lubricating performance is insufficient. If it exceeded 4 wt%, the strength of the alloy deteriorates excessively.

(e) The particle size of lead bronze alloy powder

If the particles size is coarser than −200 mesh, the distribution of graphite becomes coarse, causing the mechanical strength of the sintered alloy to deteriorate.

(f) The particle size of graphite

If the particle size is coarser than −350 mesh, the distribution of graphite becomes coarse, the toughness of the sintered alloy deteriorates, and the lubricating performance also deteriorates.

According to the present invention, the expression "−200 mesh" means a fact that at least 95% of particles of all of the particles passes through a 200-mesh screen, while the expression "−350 mesh" means a fact that at least 95% of particles of the all of the particles passes through a 350-mesh screen.

If occarsion demands, it is preferable to use $MoS_2$ as an alternative to graphite. However, the cost thereof becomes slightly arises.

PREFERRED EMBODIMENTS OF THE INVENTION

Figure 1:
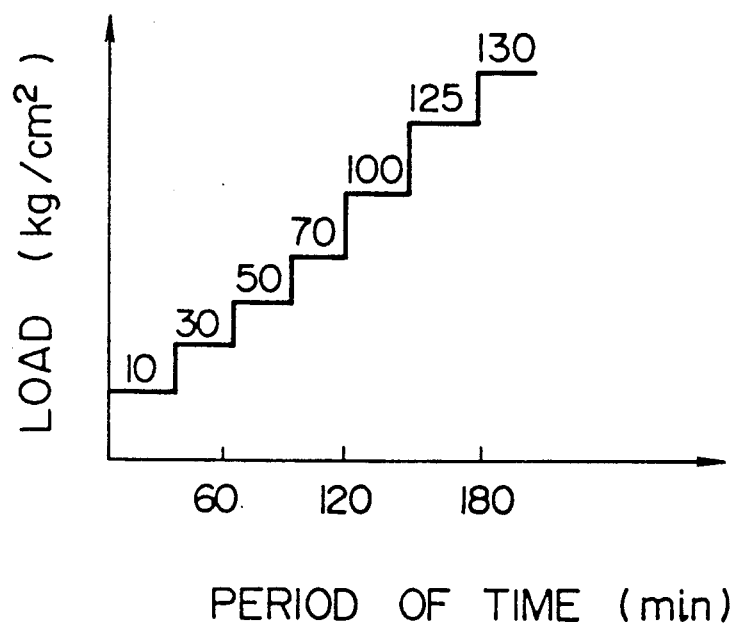
FIG. 1 is a graph which illustrates an accumulatively loading method in the seizuring test conducted for the purpose of examining seizuring resistance shown in Table 3.

Then, embodiments of the present invention will be described.

Three types of mixed powder were prepared by mixing $-200$ mesh lead bronze alloy powder and $-350$ mesh graphite powder (the composition of the first mixed powder (A): 5.5% Sn, 2.5% Pb, 0.05% P, 0.6% graphite, the balance Cu and incidental impurities; the composition of the second powder (B): 10.1% Sn, 5.1% Pb, 0.25% P, 1.0% graphite, and the balance Cu and incidental impurities; the composition of third powder (C): 15.5% Sn, 19.5% Pb, 0.95% P, 3.9% graphite, and the balance Cu and incidental impurities. Each of the thus-prepared mixed powder was distributed to form a layer having the thickness of 0.5 to 1.5 mm on the surface of a steel plate (thickness: 1.5 mm, and width: 100 mm) having a copper electrolytic-plating coating of 2 to 20 microns, preferably 5 to 10 microns. Then, a sintering was performed in hydrogen gas flows provided in a reducing furnace at 700° to 900° C. for 10 to 30 minutes. These sintered and combined materials were then respectively passed through rolls at a reduction ratio of 7 to 50%, preferably 7 to 20%. Then, they were sintered again under the conditions of 700° to 900° C. and a period of time of 10 to 30 minutes. Then, the final rolling was performed at the rolling reduction of a relatively high degree of 7 to 30%, so that three types of sliding materials (1A, 1B, and 1C) were obtained. The dimensions of the thus-obtained sliding materials were 1.6 mm in overall thickness, 0.5 mm in the thickness of the copper alloy layer, and the width of 100 mm.

If necessary, it may make the hardness of the sintered alloy after the final rolling be Hv 100 or more by repeating the above-described sintering and rolling by a required number of times.

Then, as a first comparative example, a mixed powder consisting of $-200$ mesh lead bronze alloy powder and $-350$ mesh graphite powder was prepared, the composition of which alloy consists by weight of: 0.25% P, 10.6% Sn, 4.3% graphite, and the balance Cu and incidental impurities. A multilayered sliding material having a copper alloy layer of Hv 90 in hardness was prepared by the same method as the above-described embodiment (1B) according to the present invention with the exception of the use of this mixed powder.

Then, as a second comparative example, a multilayered sliding material having a hardness Hv 125 was prepared by the same method as the above-described embodiment (1B) according to the present invention with the exception of the use of powder having the composition consisting, by weight, of 0.10% P, 10.3% Sn, 10.2% Pb, and the balance Cu and incidental impurities.

Then, in order to prepare a third comparative example, a mixed powder consisting of $-200$ mesh lead bronze alloy powder and $-350$ mesh graphite powder was prepared, the composition of which alloy consists by weight of 0.25% P, 10.1% Sn, 5.1% Pb, 1.0% graphite, and the balance Cu and incidental impurities. A multilayered sliding material was prepared by the same method as the above-described embodiment (1A) according to the present invention with the exception of the use of this mixed powder and the rolling reduction at the final rolling was reduced, and this sliding material showed the hardness of the copper alloy layer of Hv 81.

Then, to prepare a fourth comparative example, a mixed powder consisting of $-120$ mesh lead bronze alloy powder and $-150$ mesh graphite powder was prepared, the composition of which alloy consists by weight of 0.25% P, 8.6% Sn, 5.4% Pb, 1.2% graphite, and the balance Cu and incidental impurities. A multilayered sliding material was prepared by the same method as the above-described embodiment (1B) according to the present invention with the exception of the use of this mixed powder, the copper alloy layer having hardness of 83 Hv.

The details of the examples (1A, 1B, and 1C) of the sliding materials according to the present invention and comparative examples and the mechanical properties of the same are shown in Tables 1 and 2. The results of the seizuring test and wear resistance test conducted for the purpose of examining the sliding characteristics of the sliding materials are shown on Tables 3 and 4. The seizuring test was performed according to the test conditions shown in Table 5 and an accumulative loading method shown in Table 1. The wear resistance test was performed in accordance with the test conditions shown in Table 6.

The results of the adhesion strength test between the back plate and the sintered alloy layer shown in Table 2 were obtained by the following steps: sliding alloy plates (a bimetal flat plate) each having a width of B (mm) and having a backing plate was first obtained from the sliding materials according to the embodiments and the comparative examples; two parallel grooves are formed from the exterior surfaces of the sliding alloy and from the back plate, respectively, these grooves reaching the boundary bonding interface defined by the backing layer and the sintered alloy layer; and both ends of the test samples were pulled to examine the adhesion strength obtained by dividing the tensile load (Kg) by an adhered area $B \times L$ (mm$^2$), where L represents the distance (mm) between the two grooves.

The seizuring test and the wear resistance test used in the test samples are effected by use of a cylindrically coiled bush bearing having an outer diameter of 23 mm, width of 20 mm, and thickness of 1.5 mm manufactured from the bimetal flat plates obtained according to the above-described embodiments and comparative examples. The seizuring and the wear resistance test conditions are as shown in Tables 5 and 6.

As shown from Table 2, the test samples according to the present invention have excellent mechanical properties in comparison with the comparison samples in spite of the same manufacturing conditions (rolling reduction) being used. As for the powder, fine particles are effective to obtain superior characteristics in comparison with coarse powder.

As shown in Table 3, an excellent seizuring resistance was obtained according to the present invention in comparison with such materials as containing only Pb or containing only graphite or having mechanical strength deteriorated due to low rolling reduction or due to the coarse powder employed therein. Furthermore, as shown in Table 4, a relatively excellent wear resistance wa obtained by the material having a relatively large mechanical strength than that having a relatively low mechanical strength.

As described above, the multilayered sliding material of lead bronze containing graphite and according to the present invention is a material having an improved seizuring resistance and such superior sliding performance as wear resistance, seizure resisting property and etc. in comparison with conventional Cu-Sn-Pb type materials and Cu-Sn-graphite type materials. Furthermore, its mechanical properties such as wear resistance and load durability can be significantly improved by making the hardness of the alloy be not less than Hv 100 and by using fine particle size.

Although any oil grooves were not formed in the surface of the sliding alloy when effecting the tests, indents and oil grooves may of course be formed if necessary.

TABLE 1

| Type | Sample No. | Powder Employed | Chemical Composition (wt %) Cu | Sn | Pb | P | Gr | Rolling Condition |
|---|---|---|---|---|---|---|---|---|
| Present Invention | 1A | Lead Bronze + Graphite | Bal | 5.5 | 2.5 | 0.05 | 0.6 | Rolling at |
|  | 1B | −200 mesh  −350 mesh | Bal | 10.1 | 5.1 | 0.25 | 1.0 | High |
|  | 1C |  | Bal | 15.5 | 19.5 | 0.95 | 3.9 | Reduction |
| Comparative Example | 1 | Bronze + Graphite −200 mesh  −350 mesh | Bal | 10.6 | — | 0.25 | 4.3 | High Reduction |
|  | 2 | Lead Bronze −200 mesh | Bal | 10.3 | 10.2 | 0.10 | — | High Reduction |
|  | 3 | Lead Bronze + Graphite −200 mesh  −350 mesh | Bal | 10.1 | 5.1 | 0.25 | 1.0 | High Reduction |
|  | 4 | Lead Bronze + Graphite −120 mesh  −150 mesh | Bal | 8.6 | 5.4 | 0.25 | 1.2 | High Reduction |

TABLE 2

| Type | Sample No. | Hardness of Alloy layer (HV) | Tensile Strength (kg/mm$^2$) | Adhesion strength between steel back plate and alloy layer (kg/mm$^2$) | Shape of Product |
|---|---|---|---|---|---|
| Present Invention | 1A | 131 | 38 | 26 | Flat |
|  | 1B | 119 | 32 | 23 | Bimetal |
|  | 1C | 104 | 29 | 21 |  |
| Comparative Example | 1 | 90 | 26 | 20 | Flat Bimetal |
|  | 2 | 125 | 34 | 25 | Flat Bimetal |
|  | 3 | 81 | 20 | 14 | Flat Bimetal |
|  | 4 | 83 | 23 | 14 | Flat Bimetal |

TABLE 3

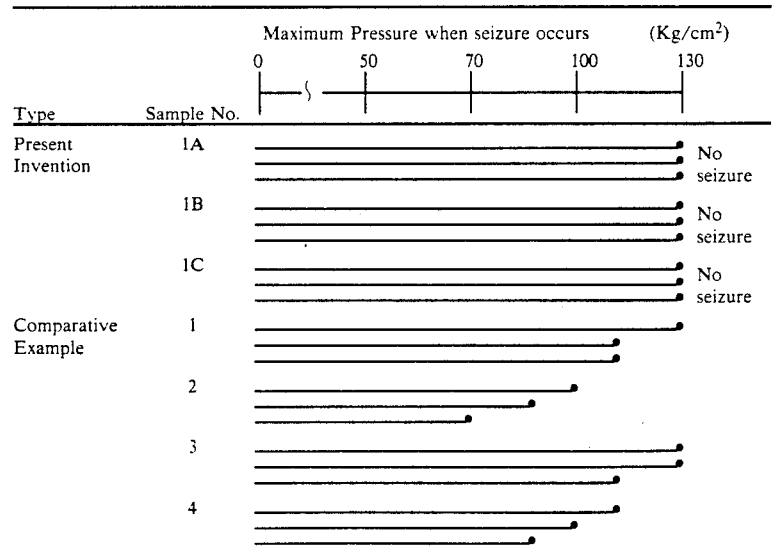

TABLE 4

| Type | Sample No. | Amount of Wear (mm) 0 — 0.02 — 0.04 — 0.06 |
|---|---|---|
| Present Invention | 1A | ———•  (≈0.012) |
|  | 1B | ——————•  (≈0.022) |
|  | 1C | ———————•  (≈0.028) |
| Comparative Example | 1 | ————————————•  (≈0.05) |
|  | 2 | ——————•  (≈0.022) |
|  | 3 | ————————————————•  (≈0.065) |
|  | 4 | ———————————————•  (≈0.06) |

TABLE 5

| | |
|---|---|
| Shaft Speed (rpm) | 955 rpm |
| Shaft Speed | 1.0 m/sec |
| Lubrication | Grease was applied at assembly. |
| Material of Shaft | S55C |
| Load | Accumulative loading method (see drawing) |
| Method of evaluate seizure | Load at a time when the temperature of the rear side of the bearing exceeds 200° C. is measured. |

TABLE 6

| | |
|---|---|
| Driving of Shaft | Start (3 minutes)-Stop (1 minute) |
| Test Period | 50 Hours |
| Shaft Speed | 1.0 m/sec |
| Lubricating oil | SAE #30 |
| Rear side temperature | 140~145° C. |
| Material of Shaft | S55C |
| Load | 50 Kg f/cm² |

What is claimed is:

1. A multilayered sliding material of lead bronze containing graphite in the form of a bimetal, comprising of a steel plate or a steel plate having a copper plating coating and a sintered copper alloy bonded to said steel plate, said sintered copper alloy having a composition consisting of 5 to 16 wt% Sn, 2 to 20 wt% Pb, 0.03 to 1 wt% P, 0.5 to 3.9 wt% graphite, and the balance Cu and incidental impurities, wherein hardness of said alloy is not less than Hv 100.

2. A multilayered sliding material of lead bronze containing graphite in the form of a bimetal, comprising a steel plate or a steel plate having a copper plating coating and a sintered copper alloy bonded to said steel plate, said sintered copper alloy having a composition consisting of 5 to 16 wt% Sn, 1 to 8 wt% Ni, 2 to 20 wt% Pb, 0.03 to 1 wt% P, 0.5 to 3.9 wt% graphite, and the balance Cu and incidental impurities, wherein hardness of said alloy is not less than Hv 100.

3. A method of producing a multilayered sliding material of lead bronze containing graphite in the form of a bimetal comprising the steps of preparing a mixture powder of both lead bronze powder passing through 200 mesh and graphite powder passing through 350 mesh, disposing the mixture powder on a surface of a steel plate or a steel plate having a plating coating such as copper, performing at least one sintering and at least one rolling step, and effecting a final rolling at a relatively high rolling reduction in order to obtain more than 100 vickers hardness of the sintered copper alloy.

* * * * *